United States Patent
McIntosh (10) Patent No.: US 11,577,909 B2
(45) Date of Patent: Feb. 14, 2023

(54) SYSTEMS AND METHODS FOR DEPLOYMENT OF A COMPACTING HEAD IN A WASTE COMPARTMENT

(71) Applicant: The Boeing Company, Chicago, IL (US)

(72) Inventor: Darren C. McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 16/893,655

(22) Filed: Jun. 5, 2020

(65) Prior Publication Data
US 2021/0380336 A1    Dec. 9, 2021

(51) Int. Cl.
*B65F 1/14* (2006.01)
*F16K 17/38* (2006.01)
*B30B 1/00* (2006.01)

(52) U.S. Cl.
CPC ............ *B65F 1/1405* (2013.01); *B30B 1/005* (2013.01); *B65F 2001/1494* (2013.01); *B65F 2210/12* (2013.01); *B65F 2210/20* (2013.01); *F16K 17/383* (2013.01)

(58) Field of Classification Search
CPC ............ B65F 1/1405; B65F 2001/1494; B65F 2210/12; F16K 17/383; B30B 1/005
See application file for complete search history.

(56) References Cited

U.S. PATENT DOCUMENTS

| | | | | | |
|---|---|---|---|---|---|
| 3,771,437 | A | * | 11/1973 | Brucken | B30B 1/005 60/516 |
| 5,511,576 | A | * | 4/1996 | Borland | F16K 17/383 137/72 |
| 5,632,297 | A | * | 5/1997 | Sciullo | F16K 17/383 137/72 |
| 6,105,597 | A | * | 8/2000 | Willetts | F16K 17/383 137/75 |
| 10,351,337 | B2 | | 7/2019 | McIntosh | |

OTHER PUBLICATIONS

Savvakis Savvas, CN 101233307, "Internal Combustion Engine", (translation), Jul. 30, 2008, 24 pgs <CN_101233307.pdf>.*
Li et al, CN 102071685, "Hydraulic Squeezing Device and Method for Pile", (translation), May 25, 2011, 23 pgs <CN_102071685.pdf>.*

* cited by examiner

*Primary Examiner* — Tuan A Vu
(74) *Attorney, Agent, or Firm* — McDonnell Boehnen Hulbert & Berghoff LLP (57) ABSTRACT

An example system for deployment of a compacting head in a waste compartment includes an eutectic alloy fusible link positioned within a waste compartment that breaks at or above a predetermined temperature, a spring tensioned deploy lever that is deployed based on a break of the eutectic alloy fusible link, a pivotal joint assembly that collapses based on deployment of the deploy lever, and a compacting head of a trash compactor that is deployed to compact contents of the waste compartment based on collapse of the pivotal joint assembly.

20 Claims, 6 Drawing Sheets

SYSTEMS AND METHODS FOR DEPLOYMENT OF A COMPACTING HEAD IN A WASTE COMPARTMENT

FIELD

The present disclosure generally relates to a trash compactor, and more particularly to systems and methods for automatic operation of the trash compactor under certain circumstances, such as for fire suppression.

BACKGROUND

In today's airplane market, space is at a premium and waste stowage has been identified as a valued item for passengers, especially in lavatories where space is of even greater focus. Lavatory trash is predominantly paper towels and tissues and can be easily compressed, but when uncompressed, such trash consumes significant volume and fills waste compartments quickly.

Currently, some airplane attendants use improvised tools to compress waste compartments in-flight. Unfortunately, such action can only be performed when the lavatory is unoccupied, and such action interrupts lavatory usage. In addition, this approach does not offer a consistent and efficient way to increase waste volume in the waste compartments.

Other existing waste management solutions for aircraft include galley trash compactors. Such trash compactors include hydraulic technology to compact trash and reduce trash volume in the galley area. These types of motorized trash compactors associated with galleys offer very high crushing forces and with that extreme compactions comes additional weight and complexity. However, aircraft lavatories do not include powered trash compactors, and the lavatory trash bins frequently fill to the top requiring flight attendants to empty the trash in route.

Moreover, trash bins typically additionally include a fire suppression system that relies on a fire extinguishing bottle of compressed gas, such as Halon, to extinguish any fires for safety.

SUMMARY

In one example, a system for deployment of a compacting head in a waste compartment is described comprising an eutectic alloy fusible link positioned within a waste compartment that breaks at or above a predetermined temperature, a spring tensioned deploy lever that is deployed based on a break of the eutectic alloy fusible link, a pivotal joint assembly that collapses based on deployment of the deploy lever, and a compacting head of a trash compactor that is deployed to compact contents of the waste compartment based on collapse of the pivotal joint assembly.

In another example, a waste compartment is described comprising a waste bin for contents, a manually operated trash compactor coupled to a ceiling of the waste compartment and manually operable to deploy a compacting head to compact the contents in the waste bin toward a floor of the waste bin, and a system coupled to the manually operated trash compactor. The system comprises an eutectic alloy fusible link that breaks at or above a predetermined temperature, a spring tensioned deploy lever that is deployed based on a break of the eutectic alloy fusible link, and a pivotal joint assembly that collapses based on deployment of the deploy lever causing deployment of the compacting head.

In another example, a method for deployment of a compacting head in a waste compartment is described comprising positioning an eutectic alloy fusible link within a waste compartment that breaks at or above a predetermined temperature, deploying a spring tensioned deploy lever based on a break of the eutectic alloy fusible link, collapsing a pivotal joint assembly based on deployment of the deploy lever, and deploying a compacting head of a trash compactor to compact contents of the waste compartment based on collapse of the pivotal joint assembly.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Disclosed examples will now be described more fully hereinafter with reference to the accompanying drawings, in which some, but not all of the disclosed examples are shown. Indeed, several different examples are described and should not be construed as limited to the embodiments set forth herein. Rather, these examples are described so that this disclosure will be thorough and complete and will fully convey the scope of the disclosure to those skilled in the art.

Example implementations described herein include a waste compartment and trash compactor that provides safety features, such as fire containment measures, enabling automatic trash compaction that may be able to suppress a fire. For example, a waste compartment includes an eutectic alloy fusible link with a frangible element that melts when exposed to fire or elevated temperatures, which causes deployment of a trash compactor mechanism to compact contents of the waste compartment for fire suppression measures.

In an example operation, the eutectic alloy fusible link melts or breaks at or above a predetermined temperature causing a spring tensioned deploy lever to deploy and collapse a pivotal joint assembly forcing a trash compactor assembly mechanism to deploy and compact contents of the waste compartment.

Figures 1, 2, 3:
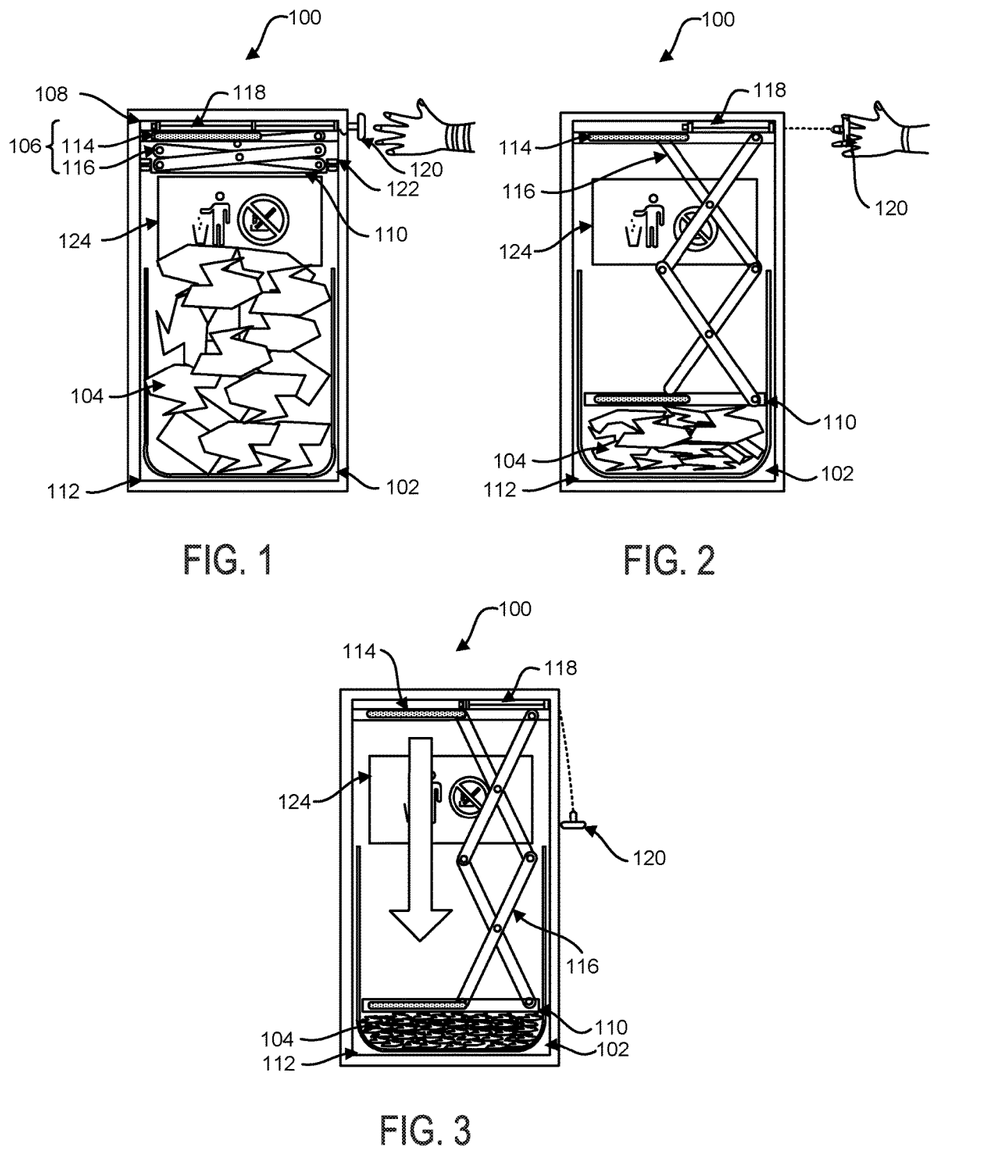
FIG. 1 illustrates a side view of a waste compartment, according to an example implementation.
FIG. 2 is a side view of the waste compartment with the manually operated trash compactor deploying the compacting head, according to an example implementation.
FIG. 3 is a side view of the waste compartment with the system automatically deploying the compacting head, according to an example implementation.

Referring now to FIG. 1, a side view of a waste compartment 100 is illustrated, according to an example implementation. The waste compartment 100 includes a waste bin 102 for contents 104, and a manually operated trash compactor 106 coupled to a ceiling 108 of the waste compartment 100 and manually operable to deploy a compacting head 110 to compact the contents 104 in the waste bin 102 toward a floor 112 of the waste bin 102. The waste compartment 100 also includes a system 114 coupled to the manually operated trash compactor 106, and the system 114 enables automatic deployment of the compacting head 110.

The manually operated trash compactor 106 includes an expansion component 116 connected to the compacting head 110, and a gas strut 118 coupled to the expansion component 116 to hold or retract the expansion component 116 to a stowed position. The manually operated trash compactor 106 also includes an actuation device 120 for manually operating the manually operated trash compactor 106. Usage of the actuation device 120 deploys the expansion component 116 from the stowed position to cause the compacting head 110 to compact trash. In this example, the actuation device 120 is a pull handle actuatable to pull a cable connecting the actuation device 120 to the expansion component 116.

FIG. 2 is a side view of the waste compartment 100 with the manually operated trash compactor 106 deploying the compacting head 110, according to an example implementation. For example, the expansion component 116 comprises scissor folding supports that include a number of arms connected through a number of pivot joints. By applying pressure to an outside of the arms located at one end of the expansion component 116 to push the arms toward each other, the expansion component 116 elongates in a crossing pattern to push the compacting head 110 downward. This can be achieved through mechanical or muscular means (e.g., hand or foot). The scissor folding supports are thus linked folding supports in a criss-cross 'X' pattern, known as a pantograph.

The gas strut 118 can then cause the expansion component 116 to retract to the stowed position via release of the actuation device 120.

In FIG. 1, the manually operated trash compactor 106 also includes a fitting 122, against which the compacting head 110 sits with the expansion component 116 in the stowed position. The fitting 122 provides a seal between the manually operated trash compactor 106 and the compacting head 110. The fitting 122 may be a gasket or rubber seal to prevent trash from entering the expansion component 116.

In the example shown in FIG. 2, the waste compartment 100 also is shown to include a waste flap 124 into which the contents 104 are provided for the waste bin 102. Once the expansion component 116 has been deployed or lowered, as shown in FIG. 2, the waste flap 124 is prevented from opening so as to prevent depositing additional trash into the waste bin 102 during trash compaction.

FIG. 3 is a side view of the waste compartment 100 with the system 114 automatically deploying the compacting head 110, according to an example implementation. The system 114 includes components configured such that an increase in temperature above a threshold temperature (e.g., as a result of heat generated from a fire within the waste bin 102) causes the system 114 to deploy the compacting head 110. For example, in instances in which the contents 104 may start on fire, a temperature in the waste bin 102 will increase. The system 114 operates at higher temperatures caused by heat and/or fire to cause the expansion component 116 to lower into the waste bin 102. Such operation can aid in fire suppression in the instance that the contents 104 are on fire. For example, lowering the expansion component 116 into the waste bin 102 can cause the compacting head 110 to smother any fire of the contents 104 aiding in fire containment.

The system 114 operates at a threshold temperature. An example threshold temperature is in a range of about 200° F. to about 400° F. Experiments were performed to determine that temperatures rise to above 800° F. at a top of the waste compartment 100 in instances of fire in the waste compartment 100, and thus, the system 114 may operate at higher temperatures as well, such as in the range of about 400° F. to about 600° F. By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

No manual operation is required for the system 114 to operate. For instance, the actuation device 120 does not require any application of force for the system 114 to operate, and in fact, based on operation of the system 114, the actuation device 120 hangs at a side of the waste compartment 100 as shown in FIG. 3. The system 114 thus provides a safety mechanism for automatic operation of trash compaction within the waste compartment 100.

Figure 4:
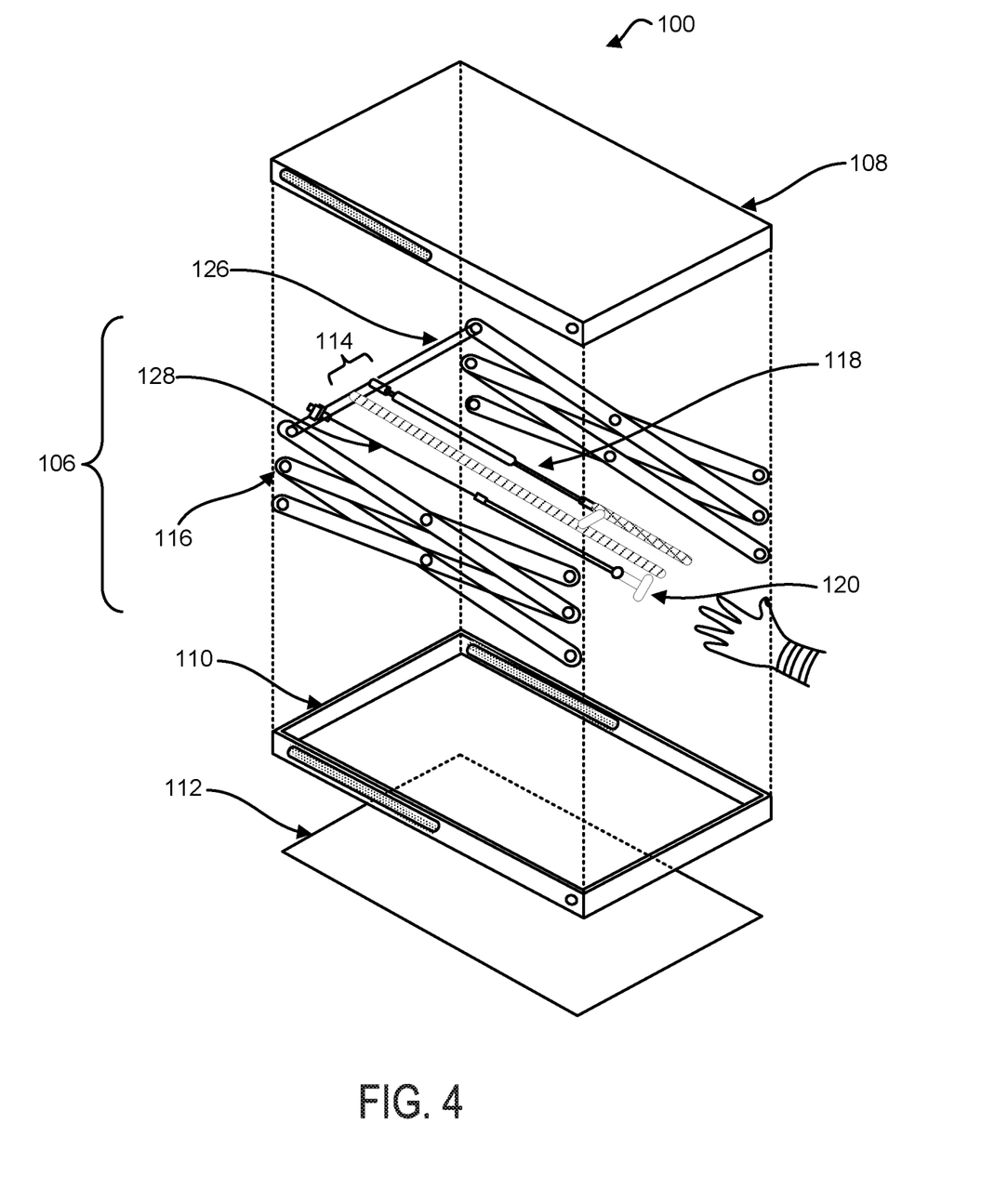
FIG. 4 illustrates a perspective view of the waste compartment with some internal components shown, according to an example implementation.

FIG. 4 illustrates a perspective view of the waste compartment 100 with some internal components shown, according to an example implementation. In FIG. 4, the manually operated trash compactor 106 includes a support rod 126 coupled to the expansion component 116, and when the expansion component 116 is deployed, the compacting head 110 is caused to compact the contents in the waste bin toward the floor 112 of the waste bin. In addition, a pull cable 128 connected to the support rod 126, and based upon manual operation of the pull cable 128 (e.g., such as by pulling the actuation device 120), the support rod 126 is pulled linearly causing deployment of the expansion component 116.

In FIG. 4, the system 114 is shown positioned substantially adjacent to the pull cable 128 in the waste compartment 100. As described, the system 114 includes components configured such that an increase in temperature above a threshold temperature causes the system 114 to deploy the compacting head 110. Movement of the expansion component 116 and the compacting head 110, whether triggered by the system 114 or by manual deployment, is accomplished similarly in that the support rod 126 is pulled linearly causing deployment of the expansion component 116.

Details of the system 114 and automatic deployment are provided below with reference to FIGS. 5-8.

Figure 5:
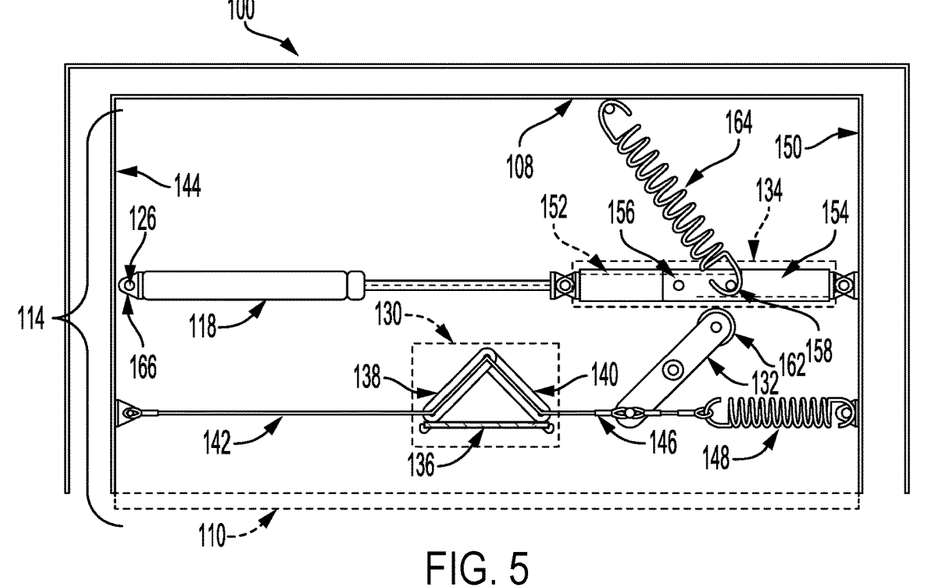
FIG. 5 illustrates a side view of a portion of the waste compartment with some internal components shown including the system, according to an example implementation.

FIG. 5 illustrates a side view of a portion of the waste compartment 100 with some internal components shown including the system 114, according to an example implementation. The system 114 for deployment of the compacting head 110 in the waste compartment 100 includes an eutectic alloy fusible link 130 positioned within the waste compartment 100 that breaks at or above a predetermined temperature, a spring tensioned deploy lever 132 that is deployed based on a break of the eutectic alloy fusible link 130, a pivotal joint assembly 134 that collapses based on deployment of the deploy lever 132, and the compacting head 110 of the trash compactor that is deployed to compact contents of the waste compartment 100 based on collapse of the pivotal joint assembly 134.

The eutectic alloy fusible link 130 includes a frangible element 136 that melts based on exposure to the predetermined temperature. Fusible alloys include metal alloys that melt at love temperatures, usually below 300° F. or 150° C., and have eutectic compositions that are often bismuth-based in combination with lead, tin, antimony, gallium, cadmium, zinc, and indium alloying constituents. Some fusible alloys are gallium-based or indium-based. Other materials that may be used include aluminum, indium, or other such metals. Using such materials, the melting point of the frangible element 136 can be configured to release at temperatures ranging from about 135° F./57° C. to about 500° F./260° C.

Thus, the frangible element 136 can be or include a fusible alloy. Whatever composition is used for the frangible element 136, the frangible element 136 is a meltable or break-away bracketry that will melts under the heat and/or fire enabling automatic operation of the system 114.

Figure 6:
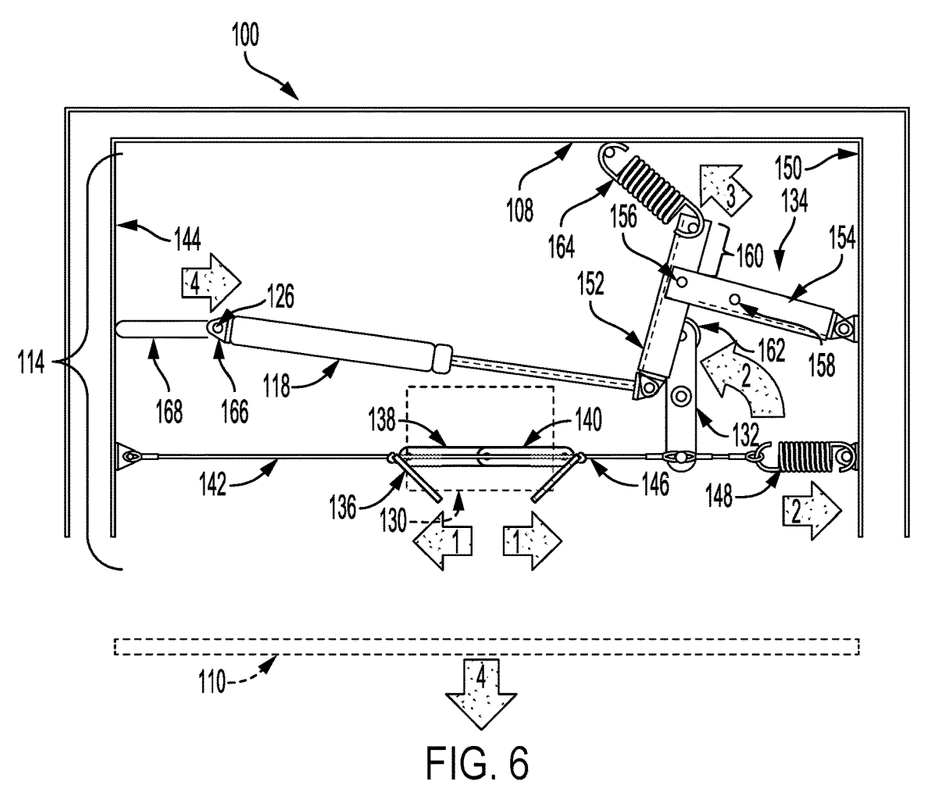
FIG. 6 illustrates a retraction sequence of the system shown in FIG. 5, according to an example implementation.

The eutectic alloy fusible link 130 also includes expansion arms 138 and 140 coupled via the eutectic alloy fusible link 130 (e.g., via the frangible element 136) into a folded configuration as shown in FIG. 5. Based on the break of the eutectic alloy fusible link 130 (e.g., melting of the frangible element 136), the expansion arms 138 and 140 expand to a substantially linear configuration (as shown in FIG. 6 and described below).

Thus, the eutectic alloy fusible link 130 is activated when ambient temperature inside the waste compartment 100 increases to a point that causes the frangible element 136 to melt and release the expansion arms 138 and 140.

A cable 142 connects the eutectic alloy fusible link 130 to a wall 144 of the waste compartment 100. For example, the expansion arm 138 connects to the cable 142. Another cable 146 connects the eutectic alloy fusible link 130 to the deploy lever 132. For example, the expansion arm 140 connects to the cable 146.

The cable 146 connects to the deploy lever 132 and to a tension spring 148. The tension spring 148 is then connected to a wall 150 of the waste compartment 100. Thus, the eutectic alloy fusible link 130 is connected between the walls 144 and 150 of the waste compartment 100 through the cable and lever configuration.

Figure 9:
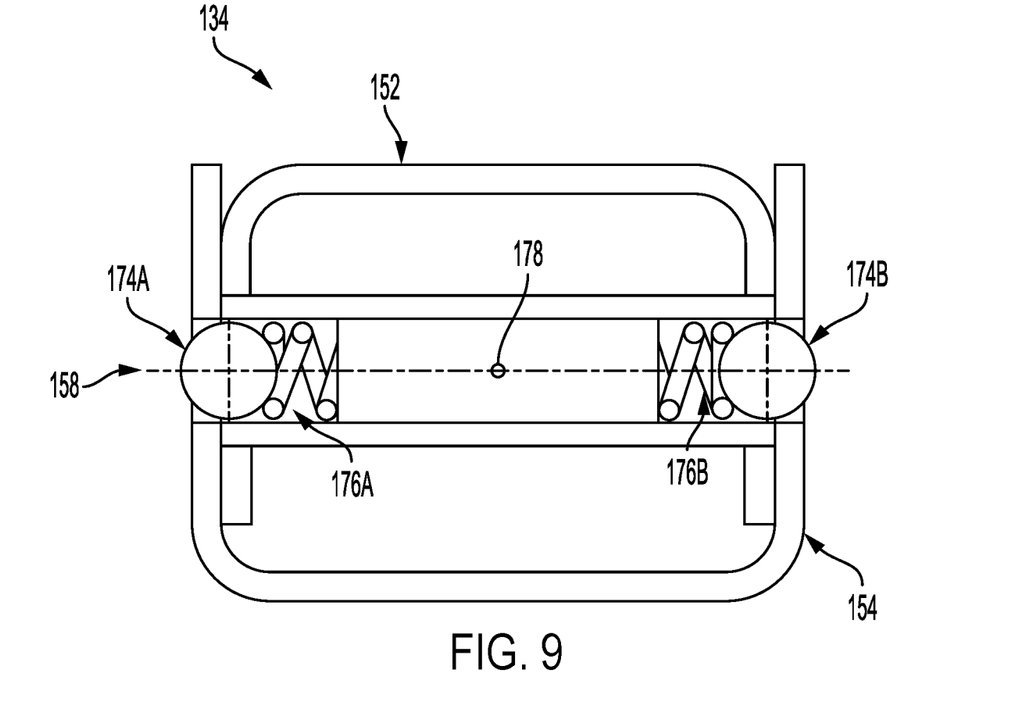
FIG. 9 illustrates a section view of a portion of the pivotal joint assembly, according to an example implementation.

The pivotal joint assembly 134 includes an upper channel 152 coupled to a lower channel 154 via a pivot joint 156 and a holding joint 158 secured by a ball detent (as shown in FIG. 9 and described below). A portion 160 (shown in FIG. 6) of the upper channel 152 is positioned inside the lower channel 154, and the ball detent is compressible to be positioned inside the upper channel 152 to release the holding joint 158 allowing the upper channel 152 to rotate with respect to the lower channel 154 along the pivot joint 156.

The deploy lever 132 also includes a roller 162 to contact the lower channel 154 during rotation of the deploy lever 132. The roller 162 enables the deploy lever 132 to rotate more freely by sliding along the lower channel 154, for example.

The system 114 also optionally includes an assist spring 164 coupled to the upper channel 152, and the assist spring 164 further causes the upper channel 152 to rotate with respect to the lower channel 154, such as by applying a pulling force on the upper channel 152. The assist spring 164 connects between the upper channel 152 and the ceiling 108 of the waste compartment 100.

The system 114 also includes the gas strut 118 coupled to the pivotal joint assembly 134 and the support rod 126, and the gas strut 118 is in an extended configuration with the compacting head 110 of the trash compactor in a stowed position, as shown in FIG. 5, with the gas strut 118 having the stroke fully extended. An end 166 of the gas strut 118 is connected to the support rod 126 (as shown in FIG. 4). In a manual retraction of the support rod 126 (e.g., by pulling the actuation device 120), the gas strut 118 compresses and is operated to deploy the compacting head 110 of the trash compactor to compact contents of the waste compartment 100.

FIG. 6 illustrates a retraction sequence of the system 114 shown in FIG. 5, according to an example implementation. Automatic deployment of the compacting head 110 by the system 114 begins with the eutectic alloy fusible link 130 melting or breaking (e.g., the frangible element 136 melts) at (or above) the predetermined temperature, as shown by arrows labeled ("1") in FIG. 6. Following, the tension spring 148 is coupled to the deploy lever 132 and to one of the expansion arms (e.g., the expansion arm 140), and based on the break of the eutectic alloy fusible link 130, the tension spring 148 causes the expansion arms 138 and 140 to expand to the substantially linear configuration and causes rotation of the deploy lever 132 for deployment of the deploy lever 132, as shown by arrows labeled ("2") in FIG. 6.

Deployment of the deploy lever 132 includes the roller 162 contacting the lower channel 154 and rolling across the lower channel 154, also as shown by arrows labeled ("2") in FIG. 6. For example, based on deployment of the deploy lever 132, the deploy lever 132 applies a force to the lower channel 154 causing the ball detent to compress and the upper channel 152 to rotate with respect to the lower channel 154 along the pivot joint 156, thus collapsing the pivotal joint assembly 134, as shown by arrows labeled ("3") in FIG. 6. Following, based on collapse of the pivotal joint assembly 134, the pivotal joint assembly 134 pulls the gas strut 118 in the extended configuration causing retraction of the support rod 126 to deploy the compacting head 110 of the trash compactor to compact contents of the waste compartment 100, as shown by arrows labeled ("4") in FIG. 6. (Not shown in FIG. 6 is the expansion component 116 pushing the compacting head 110 downward).

Note that the support rod 126 runs back and forth along a horizontal slot 168 or track within the waste compartment 100 during deployment and retraction of the expansion component 116.

Thus, in the automatic deployment of the compacting head 110 by the system 114, the gas strut 118 remains expanded, and the end 166 of the gas strut 118 connected to the support rod 126 travels along the horizontal slot 168. In contrast, in the manual deployment of the compacting head 110, the gas strut 118 is compressed to cause deployment of the expansion component 116, but the end 166 of the gas strut 118 connected to the support rod 126 still travels along the horizontal slot 168. Operation of the gas strut 118 thus differs based on manual or automatic deployment of the compacting head 110.

After deployment of the compacting head 110 by the system 114, the system 114 is reset by replacing frangible element 136 of the eutectic alloy fusible link 130. This enables a cost-effective and easy method to reset the system 114.

Figure 7:
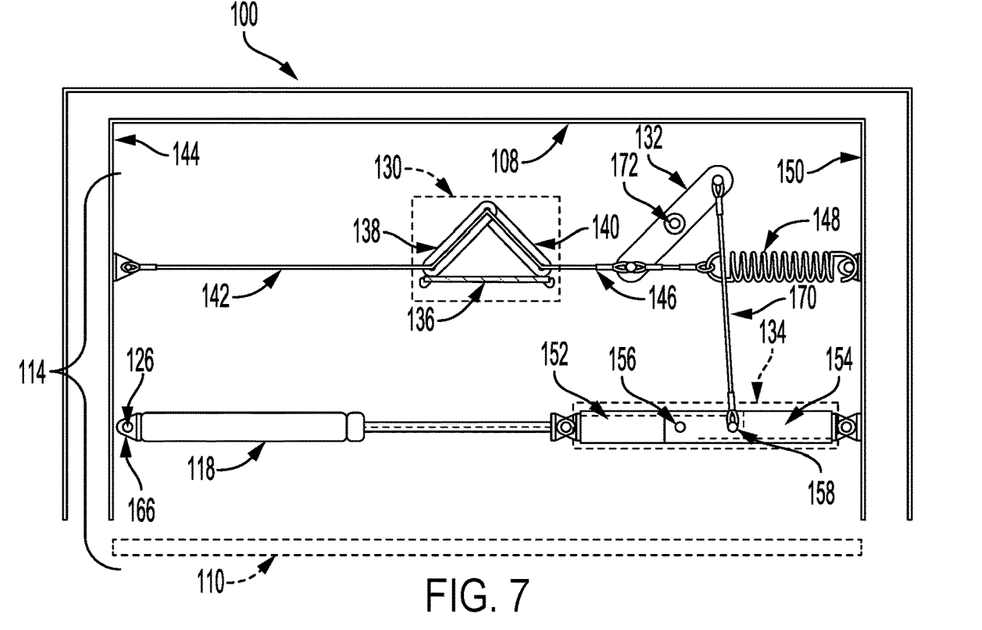
FIG. 7 illustrates a side view of another example of a portion of the waste compartment with some internal components shown including the system, according to an example implementation.

FIG. 7 illustrates a side view of another example of a portion of the waste compartment 100 with some internal components shown including the system 114, according to an example implementation. As shown in FIG. 5, the system 114 for deployment of the compacting head 110 in the waste compartment 100 includes the eutectic alloy fusible link 130 positioned within the waste compartment 100 that breaks at or above a predetermined temperature, the spring tensioned deploy lever 132 that is deployed based on a break of the eutectic alloy fusible link 130, the pivotal joint assembly 134 that collapses based on deployment of the deploy lever 132, and the compacting head 110 of the trash compactor that is deployed to compact contents of the waste compartment 100 based on collapse of the pivotal joint assembly 134.

The cable 142 connects the eutectic alloy fusible link 130 to the wall 144 of the waste compartment 100. The cable 146 connects to the deploy lever 132 and to the tension spring 148.

In the example shown in FIG. 7, there is no roller 162 coupled to the deploy lever 132 or the assist spring 164 coupled to the pivotal joint assembly 134 as included in the example configuration of FIG. 5.

Rather, in FIG. 7, a cable 170 is provided coupling the deploy lever 132 to the upper channel 152, and based on deployment of the deploy lever 132, the deploy lever 132 pulls the upper channel 152 via the cable 170 causing the ball detent to compress and the upper channel 152 to rotate with respect to the lower channel 154 along the pivot joint 156, thus collapsing the pivotal joint assembly 134. The deploy lever 132 is mounted on another pivot joint 172 enabling the deploy lever 132 to swivel along the pivot joint 172.

The gas strut 118 is coupled to the pivotal joint assembly 134 and the support rod 126, and the gas strut 118 is in an extended configuration with the compacting head 110 of the trash compactor in a stowed position, as shown in FIG. 7, with the gas strut 118 having the stroke fully extended. The end 166 of the gas strut 118 is connected to the support rod 126 (as shown in FIG. 4). Based on manual retraction of the support rod 126 (e.g., by pulling the actuation device 120), the gas strut 118 compresses and is operated to deploy the compacting head 110 of the trash compactor to compact contents of the waste compartment 100.

Figure 8:
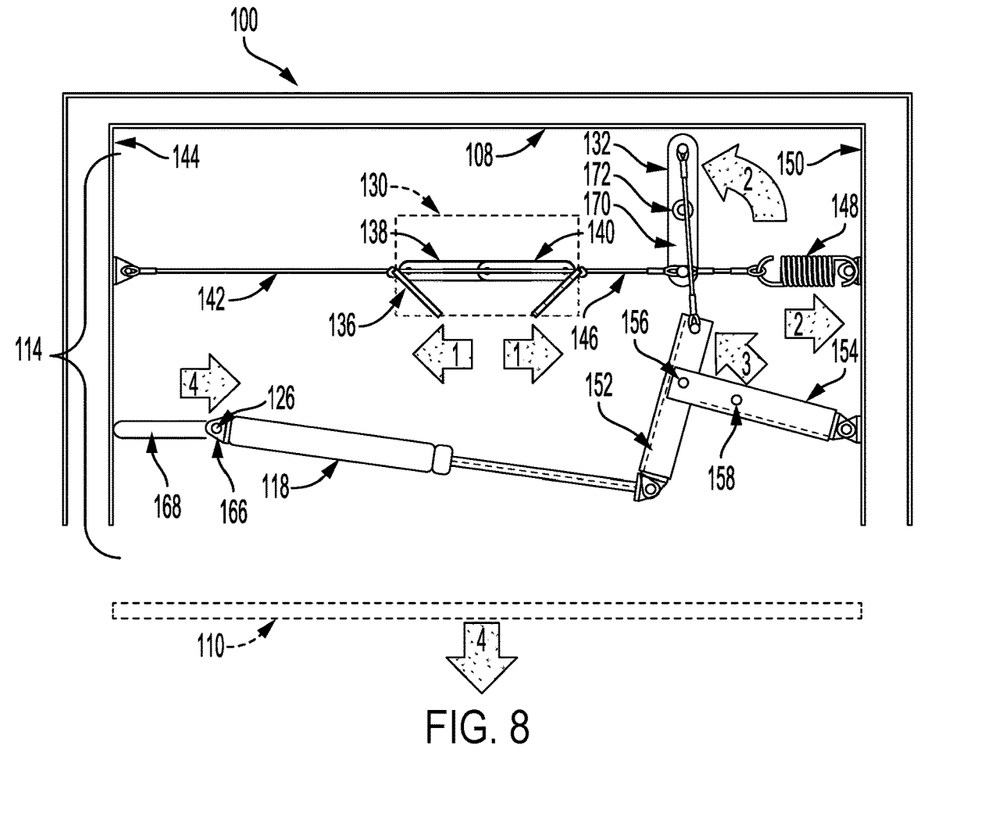
FIG. 8 illustrates a retraction sequence of the system shown in FIG. 7, according to an example implementation.

FIG. 8 illustrates a retraction sequence of the system 114 shown in FIG. 7, according to an example implementation. Automatic deployment of the compacting head 110 by the system 114 begins with the eutectic alloy fusible link 130 melting or breaking (e.g., the frangible element 136 melts) at (or above) the predetermined temperature, as shown by arrows labeled ("1") in FIG. 8. Following, the tension spring 148 is coupled to the deploy lever 132 and to one of the expansion arms (e.g., the expansion arm 140), and based on the break of the eutectic alloy fusible link 130, the tension spring 148 causes the expansion arms 138 and 140 to expand to the substantially linear configuration and causes rotation of the deploy lever 132 for deployment of the deploy lever 132, as shown by arrows labeled ("2") in FIG. 8.

Deployment of the deploy lever 132 includes the deploy lever 132 swiveling along the pivot joint 172, also as shown by arrows labeled ("2") in FIG. 8. This causes the deploy lever 132 to pull the cable 170, which applies a force to the lower channel 154 causing the ball detent to compress and the upper channel 152 to rotate with respect to the lower channel 154 along the pivot joint 156, thus collapsing the pivotal joint assembly 134, as shown by arrows labeled ("3") in FIG. 8. Following, based on collapse of the pivotal joint assembly 134, the pivotal joint assembly 134 pulls the gas strut 118 in the extended configuration causing retraction of the support rod 126 to deploy the compacting head 110 of the trash compactor to compact contents of the waste compartment 100, as shown by arrows labeled ("4") in FIG. 6. Not shown in FIG. 6 is the expansion component 116 pushing the compacting head 110 downward.

As mentioned above, like the example shown in FIGS. 5-6, the example configuration shown in FIGS. 7-8 requires operation of the gas strut 118 to differ based on manual or automatic deployment of the compacting head 110. In the automatic deployment of the compacting head 110 by the system 114, the gas strut 118 remains expanded, and the end 166 of the gas strut 118 connected to the support rod 126 travels along the horizontal slot 168. In contrast in the manual deployment of the compacting head 110 (e.g., via pulling the pull cable 128 of the actuation device 120), the gas strut 118 is compressed, but the end 166 of the gas strut 118 connected to the support rod 126 still travels along the horizontal slot 168.

The system 114 remains intact when the trash compactor 106 is operated manually. For example, manual operation includes compression of the gas strut 118. However, the pivotal joint assembly 134 remains unbroken and does not collapse due to compression of the gas strut 118.

In both of configurations of the system 114 described (e.g., a first configuration shown in FIGS. 5-6 and a second configuration shown in FIGS. 7-8), the pivotal joint assembly 134 and the eutectic alloy fusible link 130 are positioned substantially adjacent to the pull cable 128 in the waste compartment 100. Either configuration may be used depending on an amount and configuration of available space inside the waste compartment.

The waste compartment 100 thus includes two independent deployment mechanisms providing dual functionality. A first system includes a stored energy device (e.g., the gas strut 118) operating the trash compactor 106 by manual activation via pulling the actuation device 120. A second system includes the system 114 with the eutectic alloy fusible link 130 on standby in an event of an increase in temperature present within the waste compartment 100. The first and second system are independent systems operated in different manners, but adjacent to each other in the waste compartment 100.

FIG. 9 illustrates a section view of a portion of the pivotal joint assembly 134, according to an example implementation. In FIG. 9, the holding joint 158 is illustrated that secured by a ball detent assembly. The ball detent assembly includes balls 174A-B and springs 176A-B on each side of the holding joint 158 separated by a spacer 178. The upper channel 152 fits inside the lower channel 154, and the ball detent assembly keeps or maintains the upper channel 152 and the lower channel 154 in a substantially linear configuration. Based on an applied load to the lower channel 154, at least one (or both) of the balls 174A-B is pushed inward due to the spring loading and the pivotal joint assembly 134 is allowed to collapse.

Figure 10:
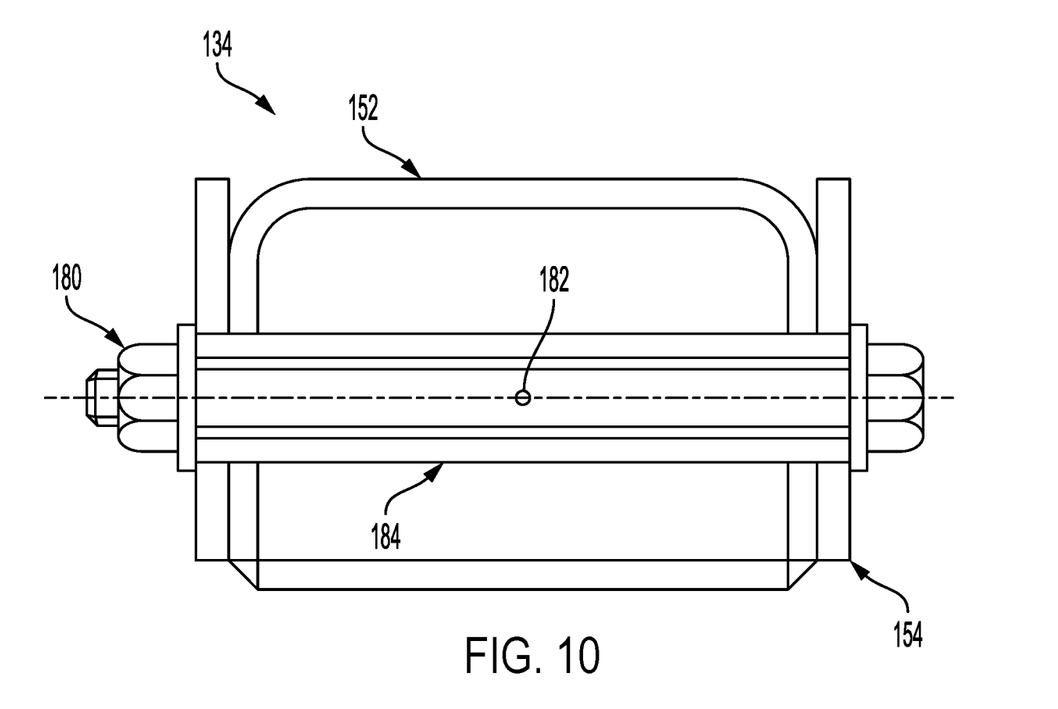
FIG. 10 illustrates a section view of another portion of the pivotal joint assembly, according to an example implementation.

FIG. 10 illustrates a section view of another portion of the pivotal joint assembly 134, according to an example implementation. In FIG. 10, the pivot joint 156 is illustrated that includes a nut/washer connection 180 securing a bolt 182 that is inserted through the upper channel 152 and the lower channel 154. A spacer tube 184 may be included through which the bolt 182 is inserted. The pivot joint 156 enables the upper channel 152 to rotate with respect to the lower channel 154, for example.

Figure 11:
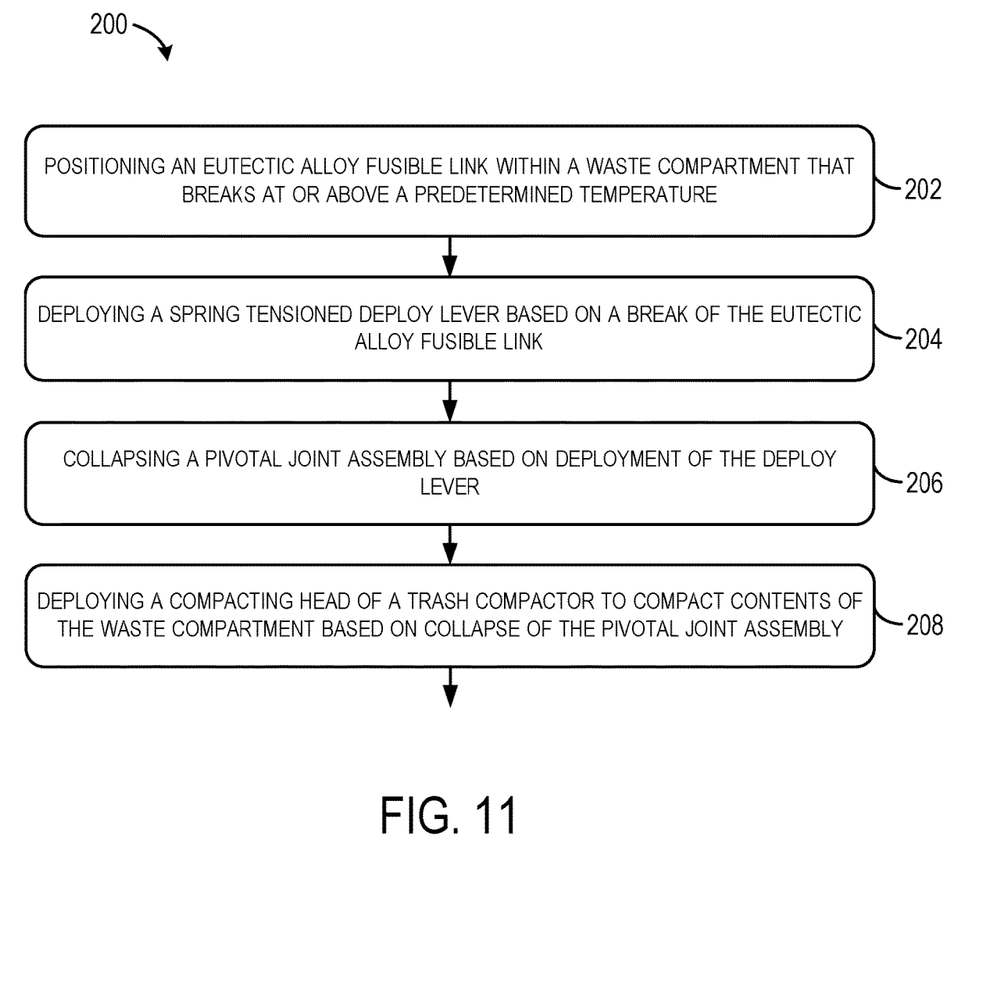
FIG. 11 shows a flowchart of an example of a method for deployment of the compacting head in the waste compartment, according to an example embodiment.

FIG. 11 shows a flowchart of an example of a method 200 for deployment of the compacting head 110 in the waste compartment 100, according to an example embodiment. Method 200 shown in FIG. 11 presents an embodiment of a method that, for example, could be used with the waste compartment 100 and the manually operated trash compactor 106 as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes positioning the eutectic alloy fusible link 130 within the waste compartment 100 that breaks at or above a predetermined temperature. As shown and described above, the eutectic alloy fusible link 130 is positioned in a spring-loaded manner between walls 144 and 150 of the waste compartment 100.

At block 204, the method 200 includes deploying the spring tensioned deploy lever 132 based on a break of the eutectic alloy fusible link 130. The deploy lever 132 is deployed due to a coupling with a common cable, e.g., the cable 146, connecting to the eutectic alloy fusible link 130.

At block 206, the method 200 includes collapsing the pivotal joint assembly 134 based on deployment of the deploy lever 132. The deploy lever 132 contacts the pivotal joint assembly 134 to break a coupling between components of the pivotal joint assembly 134, for example.

At block 208, the method 200 includes deploying the compacting head 110 of the trash compactor 106 to compact the contents 104 of the waste compartment 100 based on collapse of the pivotal joint assembly 134.

As described above, the expansion arms 138 and 140 are coupled via the eutectic alloy fusible link 130 into a folded configuration and the tension spring 148 is coupled to the deploy lever 132 and to one of the expansion arms, and the pivotal joint assembly 134 includes the upper channel 152 coupled to the lower channel 154 via the pivot joint 156 and the holding joint 158 secured by a ball detent. With such a configuration, the method 200 optionally additionally includes based on the break of the eutectic alloy fusible link 130, the tension spring 148 causing the expansion arms 138 and 140 to expand to a substantially linear configuration and causing rotation of the deploy lever 132 for deployment of the deploy lever 132. Further, based on deployment of the deploy lever 132, the deploy lever 132 applying a force to the lower channel 154 causing the ball detent to compress and the upper channel 152 to rotate with respect to the lower channel 154 along the pivot joint 156, thus collapsing the pivotal joint assembly 134.

Note that although this disclosure has described use of the methods and systems for use on aircraft, the same methods and systems functions apply equally on board any type of vehicle in order to deploy a component of a trash compactor. Within other examples, the methods and systems described herein find use within non-vehicles or stationary areas as well to enable deployment of a component of a trash compactor.

The systems and methods described herein enable a fire suppression system for use in a waste compartment using a mechanical mechanism, and can be installed directly within the waste compartment to save space as well. Existing trash compactor safety systems that rely on a fire extinguishing bottle of compressed gas can be removed.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for deployment of a compacting head in a waste compartment, comprising:
   an eutectic alloy fusible link positioned within a waste compartment that breaks at or above a predetermined temperature;
   a spring tensioned deploy lever that is deployed based on a break of the eutectic alloy fusible link;
   a pivotal joint assembly that collapses based on deployment of the deploy lever, wherein the pivotal joint assembly comprises: an upper channel coupled to a lower channel via a pivot joint and a holding joint secured by a ball detent; and
   a compacting head of a trash compactor that is deployed to compact contents of the waste compartment based on collapse of the pivotal joint assembly.

2. The system of claim 1, wherein the eutectic alloy fusible link comprises a frangible element that melts based on exposure to the predetermined temperature.

3. The system of claim 1, further comprising:
   expansion arms coupled via the eutectic alloy fusible link into a folded configuration, wherein based on the break of the eutectic alloy fusible link, the expansion arms expand to a substantially linear configuration.

4. The system of claim 3, further comprising:
   a tension spring coupled to the deploy lever and to one of the expansion arms, wherein based on the break of the eutectic alloy fusible link, the tension spring causes the expansion arms to expand to the substantially linear configuration and causes rotation of the deploy lever for deployment of the deploy lever.

5. The system of claim 1, wherein a portion of the upper channel is positioned inside the lower channel, and the ball detent is compressible to be positioned inside the upper channel to release the holding joint allowing the upper channel to rotate with respect to the lower channel along the pivot joint.

6. The system of claim 1, further comprising:
a cable coupling the deploy lever to the upper channel, and wherein based on deployment of the deploy lever, the deploy lever pulls the upper channel causing the ball detent to compress and the upper channel to rotate with respect to the lower channel along the pivot joint, thus collapsing the pivotal joint assembly.

7. The system of claim 1, wherein based on deployment of the deploy lever, the deploy lever applies a force to the lower channel causing the ball detent to compress and the upper channel to rotate with respect to the lower channel along the pivot joint, thus collapsing the pivotal joint assembly.

8. The system of claim 7, further comprising:
an assist spring coupled to the upper channel, wherein the assist spring further causes the upper channel to rotate with respect to the lower channel.

9. The system of claim 7, wherein the deploy lever comprises a roller to contact the lower channel during rotation of the deploy lever.

10. The system of claim 1, further comprising:
a gas strut coupled to the pivotal joint assembly and a support rod, wherein the gas strut is in an extended configuration with the compacting head of the trash compactor in a stowed position,
wherein based on manual retraction of the support rod, the gas strut compresses and is operated to deploy the compacting head of the trash compactor to compact contents of the waste compartment, and
wherein based on collapse of the pivotal joint assembly, the pivotal joint assembly pulls the gas strut in the extended configuration causing retraction of the support rod to deploy the compacting head of the trash compactor to compact contents of the waste compartment.

11. A waste compartment, comprising;
a waste bin for contents;
a manually operated trash compactor coupled to a ceiling of the waste compartment and manually operable to deploy a compacting head to compact the contents in the waste bin toward a floor of the waste bin; and
a system coupled to the manually operated trash compactor, the system comprising:
an eutectic alloy fusible link that breaks at or above a predetermined temperature;
a spring tensioned deploy lever that is deployed based on a break of the eutectic alloy fusible link; and
a pivotal joint assembly that collapses based on deployment of the deploy lever causing deployment of the compacting head, wherein the pivotal joint assembly comprises: an upper channel coupled to a lower channel via a pivot joint and a holding joint secured by a ball detent.

12. The waste compartment of claim 11, wherein the eutectic alloy fusible link comprises a frangible element that melts based on exposure to the predetermined temperature.

13. The waste compartment of claim 11, wherein the manually operated trash compactor further comprises:

a support rod coupled to an expansion component, which when deployed, causes the compacting head to compact the contents in the waste bin toward the floor of the waste bin; and
a pull cable connected to the support rod,
wherein based upon manual operation of the pull cable, the support rod is pulled linearly causing deployment of the expansion component.

14. The waste compartment of claim 13, wherein the pivotal joint assembly and the eutectic alloy fusible link are positioned substantially adjacent to the pull cable in the waste compartment.

15. The waste compartment of claim 11, wherein the system comprises:
expansion arms coupled via the eutectic alloy fusible link into a folded configuration, wherein based on the break of the eutectic alloy fusible link, the expansion arms expand to a substantially linear configuration.

16. The waste compartment of claim 11, further comprising:
a gas strut coupled to the pivotal joint assembly and a support rod, wherein the gas strut is in an extended configuration with the compacting head of the trash compactor in a stowed position,
wherein based on manual retraction of the support rod, the gas strut compresses and is operated to deploy the compacting head of the trash compactor to compact contents of the waste compartment, and
wherein based on collapse of the pivotal joint assembly, the pivotal joint assembly pulls the gas strut in the extended configuration causing retraction of the support rod to deploy the compacting head of the trash compactor to compact contents of the waste compartment.

17. A method for deployment of a compacting head in a waste compartment, comprising:
positioning an eutectic alloy fusible link within a waste compartment that breaks at or above a predetermined temperature;
deploying a spring tensioned deploy lever based on a break of the eutectic alloy fusible link;
collapsing a pivotal joint assembly based on deployment of the deploy lever, wherein the pivotal joint assembly comprises an upper channel coupled to a lower channel via a pivot joint and a holding joint secured by a ball detent and based on deployment of the deploy lever, the deploy lever applying a force to the lower channel causing the ball detent to compress and the upper channel to rotate with respect to the lower channel along the pivot joint, thus collapsing the pivotal joint assembly; and
deploying a compacting head of a trash compactor to compact contents of the waste compartment based on collapse of the pivotal joint assembly.

18. The method of claim 17, wherein expansion arms are coupled via the eutectic alloy fusible link into a folded configuration and a tension spring is coupled to the deploy lever and to one of the expansion arms, and wherein the method further comprises:
based on the break of the eutectic alloy fusible link, the tension spring causing the expansion arms to expand to a substantially linear configuration and causing rotation of the deploy lever for deployment of the deploy lever.

19. A system for deployment of a compacting head in a waste compartment, comprising:

an eutectic alloy fusible link positioned within a waste compartment that breaks at or above a predetermined temperature;

a spring tensioned deploy lever that is deployed based on a break of the eutectic alloy fusible link;

a pivotal joint assembly that collapses based on deployment of the deploy lever;

a compacting head of a trash compactor that is deployed to compact contents of the waste compartment based on collapse of the pivotal joint assembly;

a gas strut coupled to the pivotal joint assembly and a support rod, wherein the gas strut is in an extended configuration with the compacting head of the trash compactor in a stowed position, wherein based on manual retraction of the support rod, the gas strut compresses and is operated to deploy the compacting head of the trash compactor to compact contents of the waste compartment, and wherein based on collapse of the pivotal joint assembly, the pivotal joint assembly pulls the gas strut in the extended configuration causing retraction of the support rod to deploy the compacting head of the trash compactor to compact contents of the waste compartment.

20. The system of claim 19, wherein the eutectic alloy fusible link comprises a frangible element that melts based on exposure to the predetermined temperature.

* * * * *